(12) United States Patent
Ling

(10) Patent No.: US 7,106,813 B1
(45) Date of Patent: Sep. 12, 2006

(54) METHOD AND APPARATUS FOR COMBINED SOFT-DECISION BASED INTERFERENCE CANCELLATION AND DECODING

(75) Inventor: Fuyun Ling, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 09/526,762

(22) Filed: Mar. 16, 2000

(51) Int. Cl.
*H03D 1/00* (2006.01)
*H04L 27/06* (2006.01)

(52) U.S. Cl. .............. 375/343; 375/346; 375/348; 375/148; 375/144

(58) Field of Classification Search ............ 375/343, 375/346, 348, 349, 350, 234, 152, 144, 148, 375/142; 370/342, 341; 714/780, 795
See application file for complete search history.

(56) References Cited

U.S. PATENT DOCUMENTS

| | | | | |
|---|---|---|---|---|
| 5,031,195 A | * | 7/1991 | Chevillat et al. | 375/234 |
| 5,218,619 A | | 6/1993 | Dent | 370/209 |
| 5,852,630 A | * | 12/1998 | Langberg et al. | 375/219 |
| 6,012,161 A | * | 1/2000 | Ariyavisitakul et al. | 714/795 |
| 6,161,209 A | | 12/2000 | Moher | 714/780 |
| 6,671,338 B1 | * | 12/2003 | Gamal et al. | 375/346 |

FOREIGN PATENT DOCUMENTS

| EP | 1035681 | 9/2000 |
|---|---|---|
| GB | 2086193 A | 5/1982 |

OTHER PUBLICATIONS

Moher et al., An Iterative Algorithm for Asynchronous Coded Multiuser Detection, Aug. 1998, IEEE Communications Letters, vol. 2, No. 8, pp. 229-231.*
Reed et al., Iterative Multiuser Detection for CDMA with FEC: Near-Single-User Performance, Dec. 1998, IEEE Transactions Communications, vol. 46, No. 12, pp. 1693-1699.*
G. Bauch et al., "Iterative Equalization and Decoding for the GSM—System," VTC '98. 48th. IEEE Vehicular Technology Confernece, Ottawa, Cananda, May 18-21, 1998; IEEE Vehicular Technology Conference, New York, USA. (pp. 2262-2266).
Gersho, et al. "Adaptive Cancellation of Intersymbol Interference for Data Transmission" The Bell System Technical Journal 60(11): 1997-2021 (1981).

* cited by examiner

*Primary Examiner*—Kevin Burd
*Assistant Examiner*—Ted M. Wang
(74) *Attorney, Agent, or Firm*—Philip Wadsworth; Sandra L. Godsey; Thomas R. Rouse

(57) ABSTRACT

A method of communications channel coding gain optimization using combined ISI cancellation and turbo decoding is provided. Log-likelihood ratio probabilities with extrinsic values are computed from previous iterations of turbo decoding and used to compute the soft-decision values of channel symbols. The soft-decision values are then used to perform intersymbol interference cancellation and generate refined channel log-likelihood ratio probabilities for the next iteration of turbo decoding.

23 Claims, 3 Drawing Sheets

METHOD AND APPARATUS FOR COMBINED SOFT-DECISION BASED INTERFERENCE CANCELLATION AND DECODING

BACKGROUND OF THE INVENTION

I. Field of the Invention

The present invention relates to the field of information coding for communications systems, and more specifically to intersymbol interference cancellation and turbo coding.

II. Background

Transmission of digital data is inherently prone to noise and interference, which may introduce errors into the transmitted data. Error detection schemes have been suggested to determine as reliably as possible whether errors have been introduced into the transmitted data. For example, it is common to transmit data in packets and add to each packet a cyclic redundancy check (CRC) field, for example of a length of sixteen bits, which carries a checksum of the data of the packet.

When a receiver receives the data, the receiver calculates the same checksum on the received data and verifies whether the result of the calculation is identical to the checksum in the CRC field.

When the transmitted data is not used in real time, it is possible to request retransmission of erroneous data when errors are detected. However, reducing the transmission errors at the receiver reduces such requests, improving the efficiency of transmission. Moreover, when the transmission is performed in real time, such as, e.g., in telephone lines, cellular phones, remote video systems, etc., it is not possible to request retransmission.

Various forward error correction (FEC) coding techniques have been introduced to allow receivers of digital data to correctly determine the transmitted data even when errors may have occurred during transmission. For example, convolutional codes introduce redundancy into the transmitted data such that each bit is dependent on earlier bits in the sequence. Thus, when errors occur, the receiver can still deduce the original data by tracing back possible sequences in the received data. Moreover, the coded transmitted data may be packed into data packets.

To further improve the performance of a transmission channel, some coding schemes include interleavers, which rearrange the order of the coded bits in the packet. Thus, when interference destroys some adjacent bits during transmission, the effect of the interference is spread out over the entire original packet and can more readily be overcome by the decoding process. Other improvements may include multiple-component codes that encode the packet more than once, in parallel or in series. For example, it is known in the art to employ concatenated coding, and error correction methods that use at least two convolutional coders serially or in parallel. Such parallel encoding is commonly referred to as turbo coding.

For multiple-component codes, optimal decoding is often a very complex task, and may require large periods of time not usually available for real time decoding. Iterative decoding techniques have been developed to overcome this problem. Rather than determining immediately whether received bits are zero or one, the receiver assigns each bit a value on a multilevel scale representative of the probability that the bit is one. A common scale of such probabilities, referred to as log-likelihood ratio (LLR), represents each bit by a real number or, more commonly, an integer in some range, e.g., {−32,31}. A value of 31 signifies that the transmitted bit was a zero with very high probability, and a value of −32 signifies that the transmitted bit was a one, with very high probability. A value of zero indicates that the logical bit value is indeterminate.

Data represented on the multilevel scale is referred to as "soft data," and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from decoding of one code to improve the decoding of the second code. When serial encoders are used, two decoders may be used serially for this purpose. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one (for example, between 0 and 31 on the scale described above) are assigned binary zero, and the remaining bits are assigned binary one.

"Turbo coding" represents an important advancement in the area of FEC. There are many variants of turbo coding, but most types of turbo coding use multiple encoding steps separated by interleaving steps combined with the use of iterative decoding. This combination provides previously unavailable performance with respect to noise tolerance in a communications system. Namely, turbo coding allows communications at levels of energy-per-bit per noise power spectral density ($E_b/N_0$) that were previously unacceptable using the existing forward error correction techniques.

Many communications systems use forward error correction techniques and therefore would benefit from the use of turbo coding. For example, turbo codes could improve the performance of wireless satellite links, in which the limited downlink transmit power of the satellite necessitates receiver systems that can operate at low $E_b/N_0$ levels.

Digital wireless telecommunication systems, such as, e.g., digital cellular and PCS telephone systems, also use forward error correction. For example, the Telecommunications Industry Association has promulgated the over-the-air interface standard TIA/EIA Interim Standard 95, and its derivatives, such as, e.g., IS-95B (hereinafter referred to collectively as IS-95), which define a digital wireless communications system that uses convolutional encoding to provide coding gain to increase the capacity of the system. A system and method for processing radio-frequency (RF) signals substantially in accordance with the use of the IS-95 standard is described in U.S. Pat. No. 5,103,459, which is assigned to the assignee of the present invention and fully incorporated herein by reference.

Transmission of digital data is also inherently prone to errors caused by intersymbol interference (ISI). ISI is a common impairment introduced by the communication channel. To obtain reasonable bandwidth efficiency, the channel bandwidth is usually selected to be comparable to the channel (modulation) symbol rate. As a result, the channel impulse response must span more than one channel symbol. Hence, in addition to the component of the desired symbol, the sampled received signal usually contains contributions from multiple channel data symbols adjacent to the desired symbol. The interference caused by the adjacent symbols to the desired data symbol is called ISI. Multipath of a communication channel also introduces ISI.

If the aliased frequency spectrum of the received signal sampled at the symbol interval is a constant, ISI in the sampled received signal will be eliminated. Thus, one method to correct ISI is passing the received signal through a linear filter such that the sampled signal spectrum becomes a constant. Such a filter is conventionally called a linear equalizer. Methods known in the art for correcting ISI are known as equalization techniques. Well known equalizer techniques include the linear equalizer, decision feedback equalizer (DFE), and maximum likelihood sequence estimation (MLSE) equalizer.

It is well known that an optimal receiver front end that maximizes the received signal-to-noise ratio is a matched filter (MF) front end. If there is no ISI at the output of the matched filter, the receiver can achieve the optimum performance, called MF bound, over channels with additive Gaussian noise. Unfortunately, a matched filter usually also introduces ISI. As a result, an equalizer is usually needed to follow the MF front-end. If an equalizer is needed, the receiver will always have an inferior performance compared to the MF bound.

If the previous and future symbols of the current desired symbol are known, it is possible to attain the MF bound performance by subtracting out the ISI caused by these symbols. This technique is called ISI cancellation. Unfortunately, these symbols are usually not known and the ISI cancellation can only be implemented by using the estimates of these symbols. Thus, conventional ISI cancellation techniques are usually far from optimal, and even inferior to other equalization techniques.

There is an ongoing drive in the communications industry to continually improve coding gains. It has been found that combined maximum a posteriori (MAP) algorithms and turbo decoding outperforms ISI cancellation equalization techniques. However, the combined MAP and turbo decoding approach of improving coding gains is very complex, with the complexity of implementation increasing exponentially in relation to the number of channel taps, and according to the configuration of the channel symbol constellation.

It would be advantageous to attain the performance of combined MAP and turbo decoding techniques in a more simply realized manner by optimizing ISI cancellation techniques. ISI cancellation can be optimized by combining ISI cancellation with turbo decoding. Thus, there is a need for a reduced complexity combined turbo decoding and ISI cancellation method of improving communication channel coding gains, which can be simply realized.

SUMMARY OF THE INVENTION

The present invention provides a method of optimizing communications receive channel coding gains that performs iterative combined interference cancellation and decoding. LLRs of all the coded bits are advantageously computed at the end of each iteration of the decoding. The LLRs are mapped into soft decisions of the channel symbols. These soft-decisions are then subtracted from the matched filter output before the next iteration.

Accordingly, in one aspect of the invention, a method for optimizing the coding gain of a received wireless communications channel by subtracting a signal interference estimate from a matched filter signal in an interference canceller to produce an estimated signal, decoding the estimated signal to produce a decoded signal, and generating a signal interference estimate from the decoded signal.

In one embodiment, a next iteration signal interference estimate is generated based upon a current iteration signal interference estimate, a current decoded signal, and a previous iteration signal interference estimate.

In another aspect of the invention, an apparatus for performing coding gain optimization on a received wireless communications signal advantageously includes means for performing interference cancellation on the communications signal using signal interference estimates to produce an estimated signal, means for decoding the estimated signal to produce a decoded signal, and means for generating said signal interference estimates from said decoded signal.

In another aspect of the invention, an apparatus for performing coding gain optimization on a received wireless communications signal advantageously includes an interference canceller, a decoder coupled to the interference canceller, where the decoder receives input from the interference canceller, and where output from the decoder is coupled to the interference canceller, which generates signal interference estimates.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
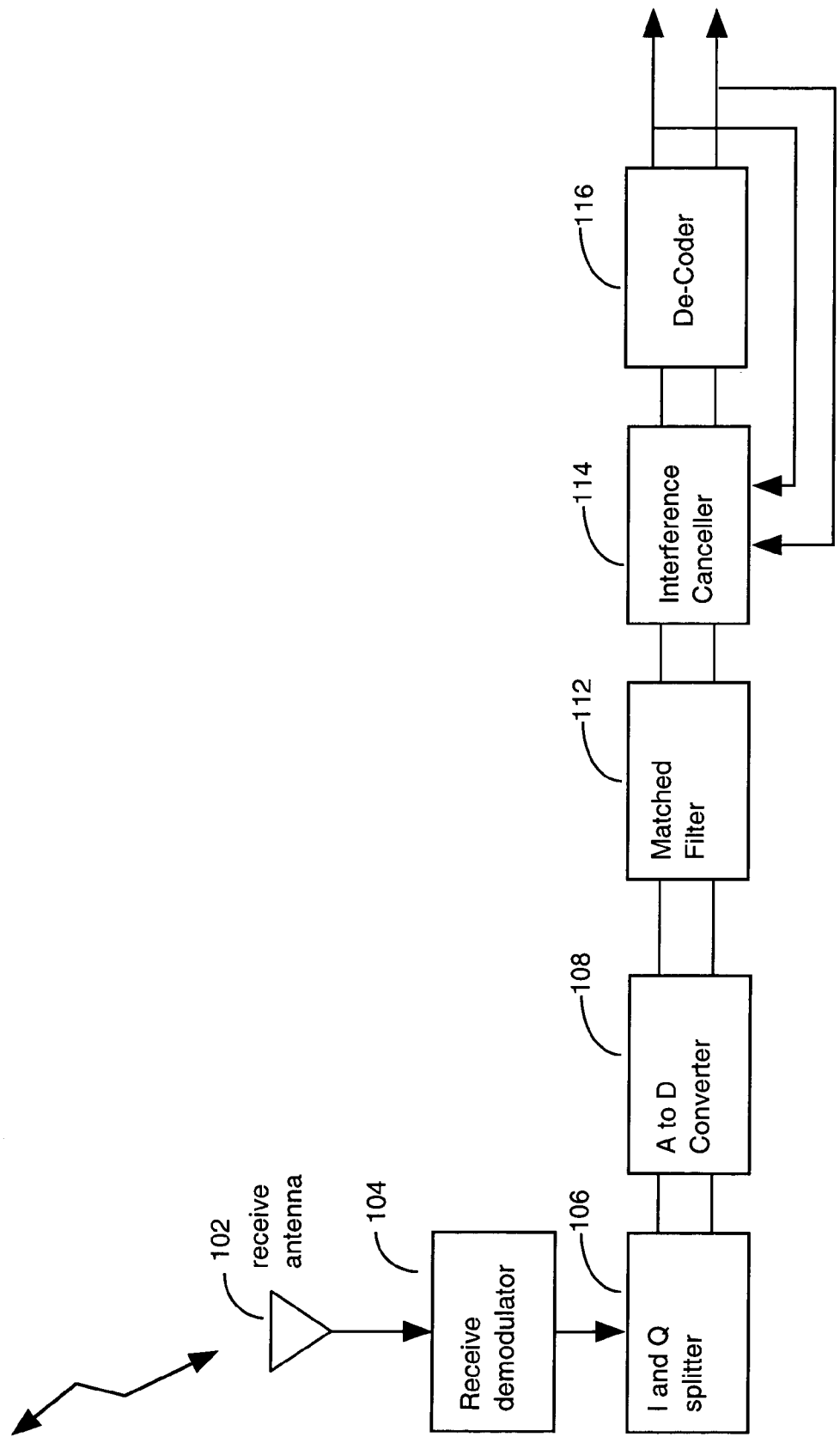
FIG. 1 is a block diagram illustrating apparatus used to combined soft-decision based intersymbol interference cancellation and turbo decoding.

FIG. 1 shows a diagram of an apparatus employed in accordance with one embodiment to combine ISI cancellation and turbo decoding for improved channel coding gain. The apparatus shown receives transmitted wireless communication signals and filters the signals for error correction to maximize the signal-to-noise ratio before ISI cancellation and turbo decoding.

An antenna 102 is advantageously a transducer that converts radio frequency (RF) fields into analog signals or vice-versa. A receive antenna typically intercepts RF energy and delivers an analog electrical signal to electronic equipment. The received analog signal reaches antenna element 102 and is downconverted to a baseband analog signal by a receive demodulator element 104.

After downconversion 104, the received signal is broken down into its In-Phase (I) and Quadrature (Q) signal components, by I/Q Splitter 106, producing a stream of I and Q signals.

The I and Q signals are converted to digital samples by A to D converter 108.

Matched filter 112 filters the digital samples to generate a stream of signal samples with maximized signal-to-noise ratio. The output of the matched filter typically contains ISI.

The output of the matched filter 112 is input to an interference canceller 114, where in the exemplary embodiment, an ISI canceller is used. In the ISI canceller 114, an estimate of the ISI is subtracted from the received symbols. One skilled in the art would understand that the teachings of the present invention are readily extended to other types of interference such as multi-user interference and multi-channel interference.

The adjusted symbol value produced by the ISI canceller 114 is input to a decoder 116 where, in the exemplary embodiment, a turbo decoder is used. One skilled in the art would understand that the teachings of the present invention are readily extended to other types of decoders such as convolutional decoders. In the turbo decoder 116, further error correction takes place. The result is fed back to the ISI canceller 114, which uses the information from the Turbo Decoder 116 to create an improved ISI cancellation estimate, which the ISI canceller 114 uses as an improved subtraction value. The feedback and improved subtraction process continues for a number of iterations equal to the number of turbo decoding iterations, producing a final, most accurate value of the received symbol.

In a receiver employing iterative turbo decoding, the likelihood values of all the coded bits can be generated directly from the output of the turbo decoder 116, as known in the art of turbo decoding. As a result, the estimates of previous and future symbols can be generated from these likelihood values and are available at each iteration. Moreover, if the ISI cancellation is perfect, the output of the ISI canceller 114 provides log-likelihood ratios of the coded bits needed by the Turbo decoder 116. Thus, ISI cancellation and turbo decoding are advantageously combined to achieve a near optimal performance. In this embodiment, a method of combined soft-decision-based ISI cancellation and turbo decoding is provided. The method applies to parallel turbo codes, as well as serial concatenated turbo codes and simple convolutional coding. One skilled in the art would understand that this method can also be applied to other interference cancellation techniques.

Figure 2:
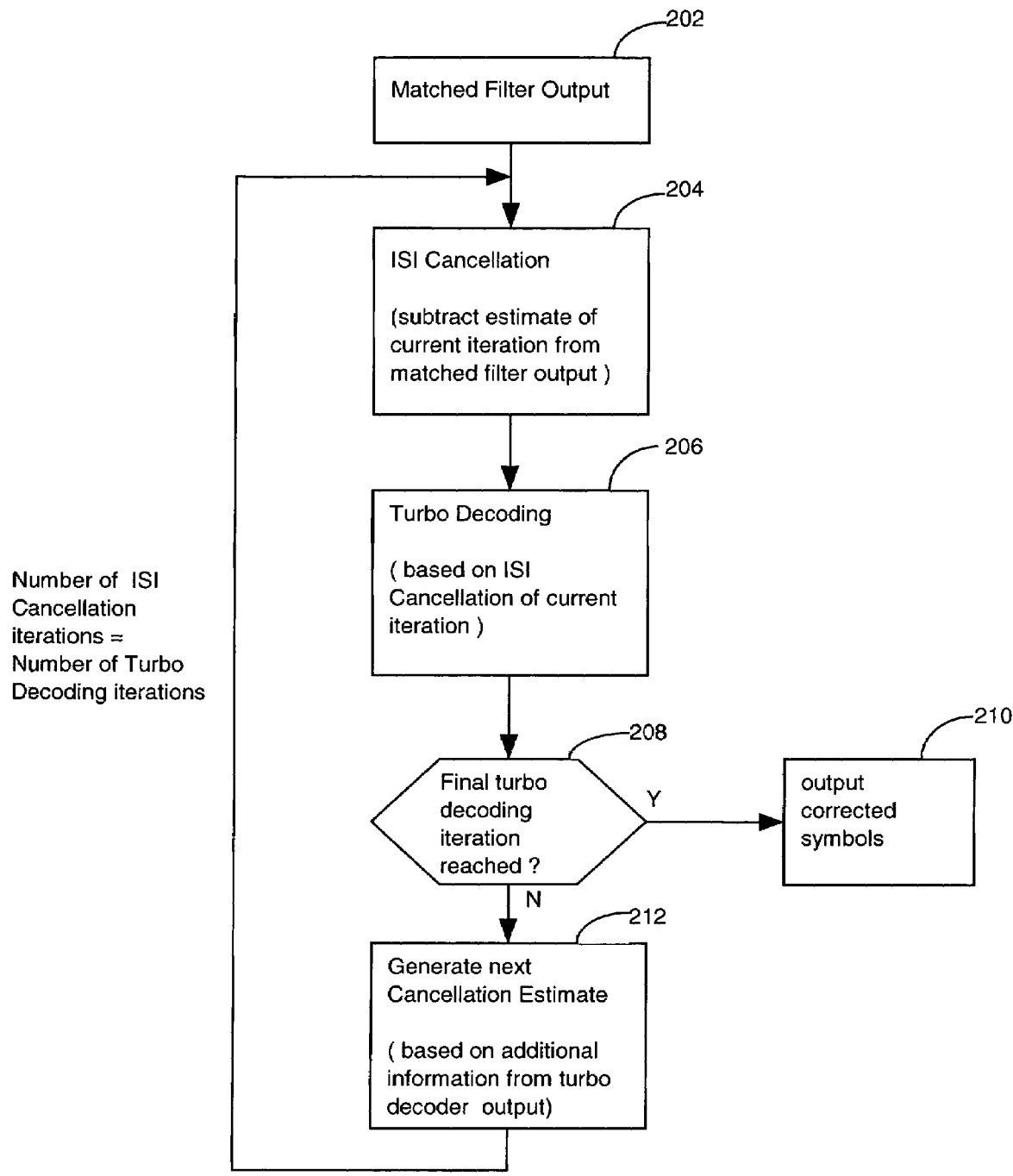
FIG. 2 is a flowchart illustrating method steps used to perform combined soft-decision based intersymbol interference cancellation and turbo decoding.

FIG. 2 shows a flowchart illustrating one embodiment of a combined ISI cancellation and turbo decoding method for achieving coding gain in a wireless communications system.

Beginning in block 202, the signal output of a matched filter, already advantageously maximized for signal to noise ratio, is input to an ISI cancellation process 204.

The ISI cancellation process 204 subtracts the current estimate of the ISI from the output of the matched filter iteratively until the best result has been achieved. For the first iteration of ISI cancellation, an estimate based on the output of the matched filter is used. For subsequent iterations, more accurate ISI estimates calculated with additional extrinsic information produced by the turbo decoder are subtracted from the matched filter output. Each iteration, the estimates of the interfering symbols are subtracted from the Matched Filter output, and the output of the ISI cancellation process 204 is input to a turbo decoding process 206. The ISI cancellation process 204 can be performed by a processing device such as a microprocessor, digital signal processor or application specific integrated circuit coupled to a processing device readable memory containing instructions for ISI cancellation.

The turbo decoding process 206 performs MAP decoding based on the ISI-cancelled result output in block 204. The turbo decoding process 206 can be performed by a processing device such as a microprocessor, digital signal processor or application specific integrated circuit coupled to a processing device readable memory containing instructions for turbo decoding.

In block 208, the turbo decoding process determines if the final turbo decoding iteration has been reached. If the final turbo decoding iteration has been reached, the best resulting corrected symbol is output as illustrated by block 210.

If the final turbo decoding iteration has not been reached, in block 212, the turbo decoding process 206 output is used to generate the estimate of symbols for subtraction in the next iteration of the ISI cancellation process 204.

In this manner, ISI cancellation using the output of turbo decoding is used as a novel approach to matched filter equalization. The ISI cancellation approach advantageously does not require ISI on a channel to be processed differently than interference from another channel. The method illustrated by FIG. 2 can alternately be employed in either a single-channel case or multi-channel case. A multi-channel case is treated as a generalization of the combined ISI cancellation and Turbo decoding, which allows consideration and correction of only the interference of a particular channel.

Figure 3:
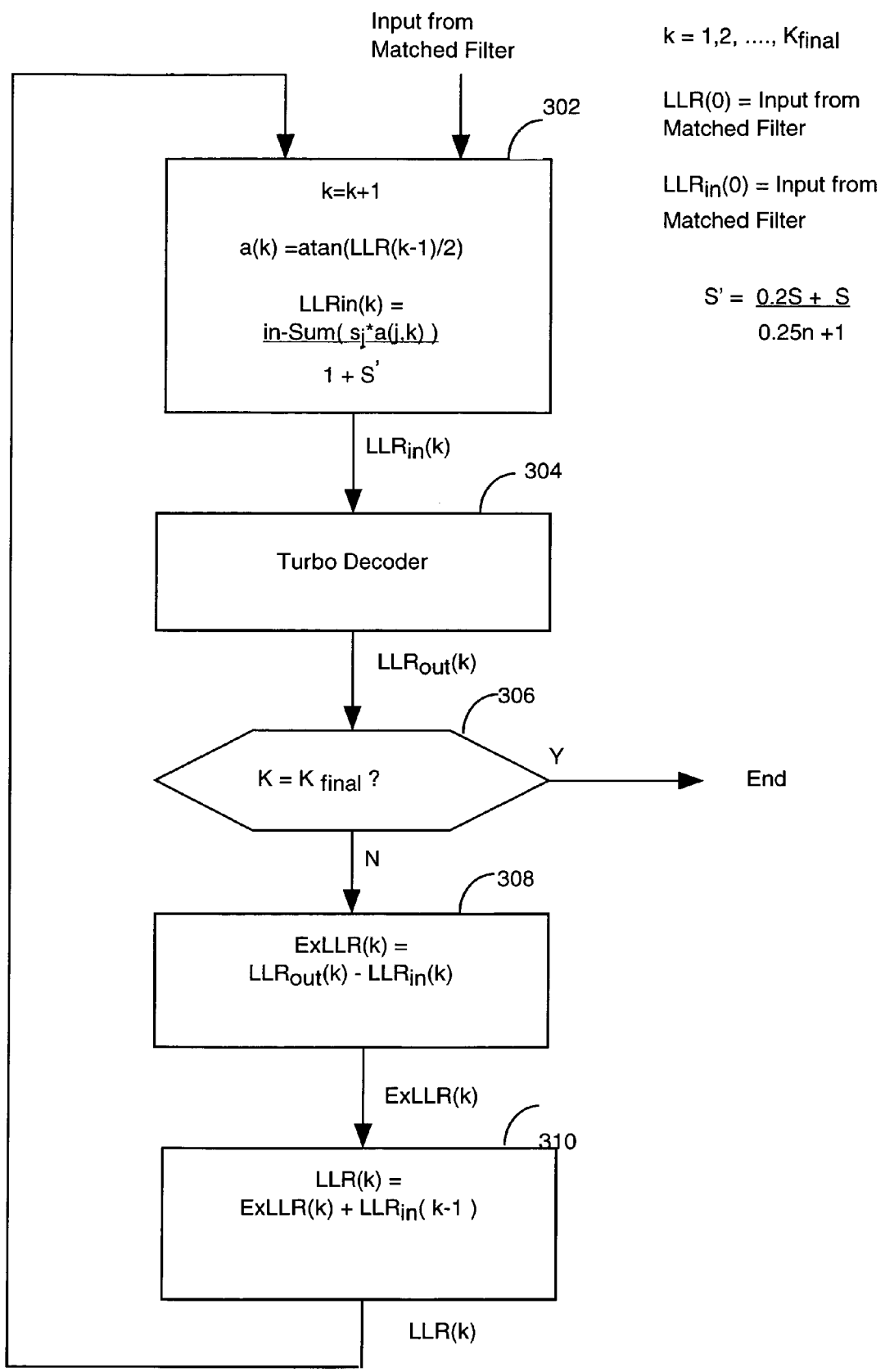
FIG. 3 is a detailed flowchart of a method used to perform combined soft-decision based intersymbol interference cancellation and turbo decoding.

FIG. 3 shows a flowchart illustrating one embodiment of a combined ISI cancellation and turbo decoding method.

The output of a matched filter is input to block 302. Block 302 illustrates soft decision ISI cancellation where k is the iteration number, which is initialized to zero and consecutively takes values of 1 to $K_{final}$, where $K_{final}$ is equal to the number of the last turbo decoding iteration. ISI cancellation is performed on all the channel symbols in a packet with different modulations such as binary phase shift keying (BPSK) or quaternary phase shift keying (QPSK) modulation. However, for simplicity, only the ISI cancellation of one BPSK modulated channel symbol, e.g., the n-th symbol, is illustrated. Block 302 outputs a value, $LLR_{in}$, for each iteration, k, where $LLR_{in}$ equals the matched filter input minus the sum of all the weighted estimates of the interfering symbols produced by the k iterations, divided by 1 plus S'. The value of an estimated BPSK interfering symbol for each iteration, k, is the arctangent of one half of the LLR of the corresponding coded bit generated in previous iteration, k−1. The value of S' is a monotonically decreasing function modeling the reduction in ISI for each iteration, k, which is dependent on the variance of the total ISI, S at the MF output. For the first iteration in the process, the value of LLR is advantageously set to the matched filter input. The value $LLR_{in}$ is input to a turbo decoding step 304 for each iteration, k.

The turbo decoding step of block 304 produces an output value LLRout for each iteration, k. During turbo decoding, the LLR values of the coded bits are computed and refined in each iteration to produce increasingly more accurate interference estimates.

In block 306, a turbo decoder determines if the final turbo decoding iteration, $K_{final}$, has been reached. If the final turbo decoding iteration has been reached, the best resulting corrected symbol is output.

If the final turbo decoding iteration has not been reached, in block 308, another, more refined estimate of the interference for each iteration k, ExLLR, is output. ExLLR includes extrinsic information created by subtracting the output of the soft decision ISI cancellation for the current iteration, $LLR_{in}$, from the output of the turbo decoder, $LLR_{out}$, for the current iteration.

Then, in block 310, a new LLR for the current iteration is computed by adding ExLLR of the current iteration to $LLR_{in}$ of the previous iteration. The $LLR_{in}$ value of the previous iteration, rather than the current iteration, is added to ExLLR (the extrinsic information of the current iteration) because using the delayed value of $LLR_{in}$ advantageously adds stability to the process. The use of delayed $LLR_{in}$ values in computing the LLR for use in the next iteration of ISI cancellation for stability is novel, and one skilled in the art would understand that it can be applied to other interference cancellation techniques.

Soft-decision-based ISI cancellation and turbo decoding combined in the manner described in FIG. 2 and FIG. 3 is a novel combination that achieves near optimal performance of the communications channel. The achievement of near optimal performance by employing a combined soft decision ISI cancellation and turbo decoding method is supported by the following analysis.

For example purposes in a particular embodiment, the received signal of a digital Matched filter front-end is sampled at T/2, where T is the channel symbol rate. When the channel noise is white and the channel coefficients at the sampling instants are known, or can be estimated accurately, the matched filter coefficients are simply the conjugate of the time-reversed channel coefficients. The matched filter output is down sampled at every T. The output of the matched filter that maximizes the signal to interference ratio (SIR) of a(n), the data symbol transmitted at nT, can be expressed as:

$$y(nT) = \sum_{i=-m}^{m} s_i a(n-i) + z(n) \tag{1}$$

where z(n) is the additive noise/interference (excluding ISI) at the output of the matched filter and $s_i a(n-i)$, $i=-m, \ldots, -1, 1, \ldots, m$ are the ISI terms. In this analysis, without loss of generality, the variance of noise/interference in the signal samples at the input of the MF are taken to be equal to 1. For BPSK (QPSK) signaling, $a=\pm 1(\pm 1 \pm j)$. The ISI coefficients $s_i$ are determined by the channel coefficients and they are complex conjugate symmetric, i.e., $s_{-i}=s^*_i$.

When the noise variance of the input signal samples is equal to 1, the LLR of the BPSK a(n) can be expressed as $$\lambda(n) = 4s_0 a(n) = 4 \times \left( y(nT) - \sum_{\substack{i=-m \\ i \neq 0}}^{m} s_i a(n-i) \right) \tag{2}$$

which can be directly used as the input to turbo decoding. A receiver with a decoder employing such LLRs can achieve the optimal performance of an ISI-free channel. However, to compute the optimal LLR, it is necessary to know the previous and future symbols. These symbols are not known because, otherwise, decoding would be unnecessary. Thus, this approach, while it is theoretically optimal, is impractical to realize.

An alternative is directly using y(nT) in turbo decoding by treating the ISI terms as noise. When the total ISI has a close-to-Gaussian distribution, the LLR of a(n) can be expressed as $4y(nT)/(1+S)$ where S is the total additional noise variance due to ISI.

Considering a simple case of m=1, $$r(nT)=c_0 a(n)+c_1 a(n+1)+v(n) \tag{3}$$

and $$y(nT)=s_0 a(n)+s_1 a(n+1)+s_{-1} a(n-1)+z(n) \tag{4}$$

where $s_0=|c_0|^2+|c_1|^2$ and $s_1=s^*_{-1}=c^*_0 c_1$. Since the variance of v(n) is one, the variance of z(n) is equal to $|c_0|^2+|c_1|^2$. The variance of the total interference plus noise is equal to $|c_0|^2+|c_1|^2+2|c_0|^2|c_1|^2$. Thus, the LLR can be expressed as $$\frac{4y(nT)}{1+2|c_0|^2|c_1|^2/(|c_0|^2+|c_1|^2)}$$

which is written as $$\frac{4g(hT)}{1+S}.$$

For the case where there are more than two paths, the additional noise variance can be computed similarly.

When the previous and future symbols are not known but their estimates are available, the LLRs can be calculated by using the estimates in the places of their true values. Obviously, such ISI cancellation will be imperfect. As a result, an approximation of the optimal LLR value is as follows:

$$\hat{\lambda}(n) = 4 \times \left( y(nT) - \sum_{\substack{i=-m \\ i \neq 0}}^{m} s_i \hat{a}(n-i) \right) / (1+S') \tag{5}$$

where â(n-i) is the estimate of a(n-i) and S' is the normalized additional noise variance due to imperfect interference cancellation. Since the interference is partially cancelled, S' will be greater than zero and less than S. If â(n-i) take the value +1 or -1, we call them the hard decisions of a(n-i). On the other hand, if â(n-i) can take an arbitrary value, they are called the "soft" decisions of a(n-i).

During turbo decoding, the LLRs of the systematic bits are computed and refined in each iteration. It is straightforward to compute the LLRs of all the coded bits at the same time. Even though the data symbols (mapping of the coded bits) can take only +1/-1 values, for ISI cancellation, it is optimum to use soft decisions of the channel bits according to their estimated LLRs, such that the resulting error term caused by the residual ISI due the imperfect decision is minimized. Below, the expression of the optimal soft decision that minimizes the variance of the residual error is derived:

By definition, the LLR of a binary symbol that takes a value of +1 or -1 is:

$$\lambda(x|a)=\log(p(x|a)/p(x|-a)) \tag{6}$$

where a=1 or -1. It is well known that that $$\lambda(x|a=1)=-\lambda(x|a=-1) \tag{7}$$

The variance of the residual error due to imprecise decision can be expressed as:

$$E[|a-\hat{a}|^2] = p(\hat{a}|a)E[|a-\hat{a}|^2] + p(\hat{a}|-a)E[|-a-\hat{a}|^2] = \tag{8}$$

$$p(\hat{a}|a)E[-2a\hat{a}+\hat{a}^2] + p(\hat{a}|-a)E[|2a\hat{a}+\hat{a}^2|^2]$$

To minimize the variance the derivative of equation (8) is taken with respect to â and set equal to zero yielding the equation (9):

$$\frac{d}{d\hat{a}} E[|a-\hat{a}|^2] = 2(p(\hat{a}\mid -a) - p(\hat{a}\mid a))\hat{a} + 2(p(\hat{a}\mid a) + p(\hat{a}\mid -a))a = 0 \quad (9)$$

Namely, $$\hat{a} = \frac{p(\hat{a}\mid a) + p(\hat{a}\mid -a)}{p(\hat{a}\mid a) - p(\hat{a}\mid -a)} \quad a = \frac{p(\hat{a}\mid a) - p(\hat{a}\mid a)}{p(\hat{a}\mid a) + p(\hat{a}\mid a)} a \quad (10)$$

From equation (6) we have $$\frac{p(x\mid a)}{p(x\mid -a)} = \exp(\lambda(x\mid a)) \quad (11)$$

letting a=1, $$\hat{a} = \frac{p(\hat{a}\mid 1) - p(\hat{a}\mid 1)}{p(\hat{a}\mid 1) + p(\hat{a}\mid 1)} = \quad (12)$$

$$\frac{\exp(\lambda(x\mid 1)) - 1}{\exp(\lambda(x\mid 1)) + 1} = \frac{\exp\left(\frac{\lambda(x\mid 1)}{2}\right) - \exp\left(\frac{\lambda(x\mid 1)}{2}\right)}{\exp\left(\frac{\lambda(x\mid 1)}{2}\right) + \exp\left(\frac{\lambda(x\mid 1)}{2}\right)}$$

Namely, $$\hat{a} = \tanh\left(\frac{\lambda(x\mid 1)}{2}\right) = -\tanh\left(\frac{\lambda(x\mid -1)}{2}\right) \quad (13)$$

When x goes to infinity, there is total confidence of its likelihood, $\hat{a}$ is equal to +1 or −1 depending on the sign of $\lambda(x|1)$.

For QPSK modulation, the estimates of the real and imaginary parts of a symbol are also generated according to equation (13) from their corresponding coded bits.

In order to describe how turbo decoding with ISI cancellation is performed, it is first necessary to consider how the LLR is used and refined in turbo decoding for an ISI-free static additive Gaussian white noise (AWGN) communication channel. The description given below applies to both serial and parallel concatenated codes.

The optimal receiver front-end for such channels comprises a matched filter followed by a channel symbol rate A/D sampler. For BPSK signaling the value of the real part of the sampler output times 4 divided by the noise variance is the LLR of the coded bits. These values are called the channel LLRs of the coded bits.

The channel LLRs of some of the coded bits are directly used as the LLRs of the coded bits in turbo decoding without modification during the iterative decoding process. The LLRs of the remainder of the coded bits are continuously refined each iteration in MAP decoding of a constituent code by adding the extrinsic information (generated during MAP decoding) to the channel LLRs. This process is briefly described below.

During turbo decoding, the constituent codes are MAP decoded one by one in a cyclic fashion. In an iteration of turbo decoding every constituent code is decoded once. To perform MAP decoding of a constituent code, refined LLRs of some or all coded bits are fed to the decoder. The input refined LLR is equal to the sum of the channel LLR of the coded bit and an extrinsic value that is generated when decoding the previous constituent code (the initial extrinsic value is set to be zero). After the MAP decoding is completed, a new LLR value is generated for each bit. This new LLR value can be expressed as the input LLR value plus a new extrinsic value, i.e., it can be viewed as the sum of the channel LLR, the previous extrinsic value, and the new extrinsic value. The previous extrinsic value is subtracted from the new LLR value and the difference, i.e., the sum of the channel LLR and the new extrinsic value, is used as the new refined LLR for decoding the next constituent code in the iterative decoding process.

The LLRs with extrinsic values computed from the previous iteration of turbo decoding are used to compute the soft-decision of the channel symbols according to equation (13). The soft-decision is then used to perform ISI cancellation and generate the refined channel LLRs according to equation (5) for the next iteration of turbo decoding.

Before turbo decoding is performed, the initial estimates of the channel symbol are generated according to equation (13) using the raw channel LLRs given by equation (1) or equation (4). These initial channel symbol estimates are used to perform ISI cancellation to generate a first set of refined channel LLRs according to equation (5) for performing the first iteration of turbo decoding. During the first iteration of turbo decoding, the MAP decoding algorithm generates the LLRs of all the channel bits. These LLRs are used to generate a second set of channel symbol estimates. The second set of refined LLRs is generated according to equation (13) using the second set of channel symbol estimates. These refined LLRs are used in the second iteration of turbo decoding. These steps may advantageously be repeated until enough iterations of turbo decoding are performed to obtain the desired result.

The desired result in obtaining the refined LLRs of the coded bits for the channel symbol generation can be achieved by using extrinsic information similar to what is done in turbo decoding. Specifically, it is helpful to consider the k-th iteration as an example. The channel LLRs of the k-th iteration, denoted by $LLR_{in}(k)$, are generated according to equation (5) using the LLRs of the channel bits, denoted by $LLR_{in}(k-1)$, from iteration k−1 and used in the k-th iteration of turbo decoding, which generates a set of new LLRs of the channel bits, denoted by $LLR_{out}(k)$. When the k-th iteration is completed, the extrinsic values ExLLR(k) are generated by subtracting the input channel LLRs, $LLR_{in}(k)$, from the output generated LLRs of the channel bits, $LLR_{out}(k)$. The differences, ExLLR(k), are added to the input LLR of the previous iteration to yield the new LLRs of the channel bits, denoted as LLR(k), for generating the soft decisions of the coded bits. These new soft decisions are used to generate the next set of channel LLRs, denoted as $LLR_{in}(k+1)$, to be used in the (k+1)-th iteration.

As shown by equation (5), when the input noise variance is normalized to zero, the optimal scaling factor depends on the variance of the residual ISI. It is possible to estimate the variance of the residual ISI each iteration, and scale the LLRs accordingly. To simplify implementation, let S' in equation (5) be a monotonically decreasing function to model the reduction in ISI in each iteration. An exemplary function given by $$S'(n) = \frac{0.2S + S}{0.25n + 1}$$

where S is the variance of the total ISI as described above, has proven to be effective. For example, this approach can be effectively used in decoding of coded partial response signals.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for optimizing the coding gain of a received wireless communications signal, the method comprising the steps of:
   a) determining an intersymbol interference (ISI) estimate;
   b) subtracting the intersymbol interference (ISI) estimate from a matched filter signal in an interference canceller to produce an estimated signal;
   c) generating a log-likelihood ratio based on the estimated signal, wherein the log-likelihood ratio is scaled according to an estimated variance of a residual intersymbol interference;
   d) decoding said estimated signal using the log-likelihood ratio to produce a decoded signal; and
   e) generating a revised intersymbol interference (ISI) estimate from said decoded signal.

2. The method of claim 1 further comprising the step of: repeating steps a) through e) for multiple iterations, wherein one iteration comprises steps a) through e).

3. The method of claim 2 further comprising the step of: generating the revised intersymbol interference (ISI) estimate based upon a current iteration signal interference estimate, a current decoded signal, and a previous iteration signal interference estimate.

4. An apparatus for performing coding gain optimization on a received wireless communications signal, comprising:
   means for performing interference cancellation on the communications signal using an intersymbol interference (ISI) estimate to produce an estimated signal;
   means for generating a log-likelihood ratio based on the estimated signal, wherein the log-likelihood ratio is scaled according to an estimated variance of a residual intersymbol interference;
   means for decoding the estimated signal using the log-likelihood ratio to produce a decoded signal; and
   means for generating a revised intersymbol interference (ISI) estimate from said decoded signal.

5. The apparatus of claim 4 wherein said means for decoding comprises a parallel concatenated turbo decoder.

6. The apparatus of claim 4 wherein said means for decoding comprises a serial concatenated turbo decoder.

7. The apparatus of claim 4 wherein said means for decoding comprises a convolutional decoder.

8. The apparatus of claim 4 wherein said means for performing interference cancellation cancels intersymbol interference.

9. The apparatus of claim 4 wherein said means for performing interference cancellation operates on a single communication channel.

10. The apparatus of claim 4 wherein said means for performing interference cancellation operates on a plurality of communications channels.

11. The apparatus of claim 4 wherein said means for performing interference cancellation operates on a partial response communications signal.

12. An apparatus for performing coding gain optimization on received wireless communications signal, comprising:
   an interference canceller configured to subtract an intersymbol interference (ISI) estimate from a matched filter signal to produce an estimated signal and generate a log-likelihood ratio based on the estimated signal, wherein the log-likelihood ratio is scaled according to an estimated variance of a residual intersymbol interference; and
   a decoder configured to decode the estimated signal using the log-likelihood ratio to produce a decoded signal, wherein the decoded signal is coupled to the interference canceller which generates a revised intersymbol interference (ISI) estimate.

13. The apparatus of claim 12 wherein said decoder is a parallel concatenated turbo decoder.

14. The apparatus of claim 12 wherein said decoder is a serial concatenated turbo decoder.

15. The apparatus of claim 12 wherein said decoder is a convolutional decoder.

16. The apparatus of claim 12 wherein said interference canceller is an intersymbol interference canceller.

17. The apparatus of claim 12 wherein said interference canceller operates on a single communications channel.

18. The apparatus of claim 12 wherein said interference canceller operates on a plurality of communications channels.

19. The apparatus of claim 12 wherein said interference canceller operates on a partial response communications signal.

20. An apparatus for performing combined soft decision interference cancellation and convolutional decoding comprising:
   means for canceling interference in a received wireless communications signal estimated by subtracting an intersymbol interference (ISI) estimate from a matched filter signal in an interference canceller to produce an estimated signal;
   means for generating a log-likelihood ratio based on the estimated signal, wherein the log-likelihood ratio is scaled according to an estimated variance of a residual intersymbol interference;
   means for decoding the estimated signal using the log-likelihood ratio to produce a decoded signal; and
   means for generating a revised intersymbol interference (ISI) estimate from the decoded signal.

21. The apparatus of claim 20 wherein said processing device is a microprocessor.

22. The apparatus of claim 20 wherein said processing device is a digital signal processor.

23. The apparatus of claim 20 wherein said processing device is an application-specific integrated circuit.

* * * * *